Feb. 7, 1939.   H. A. STILSON   2,146,361
ANIMAL TRAP
Filed Feb. 15, 1937   2 Sheets-Sheet 1
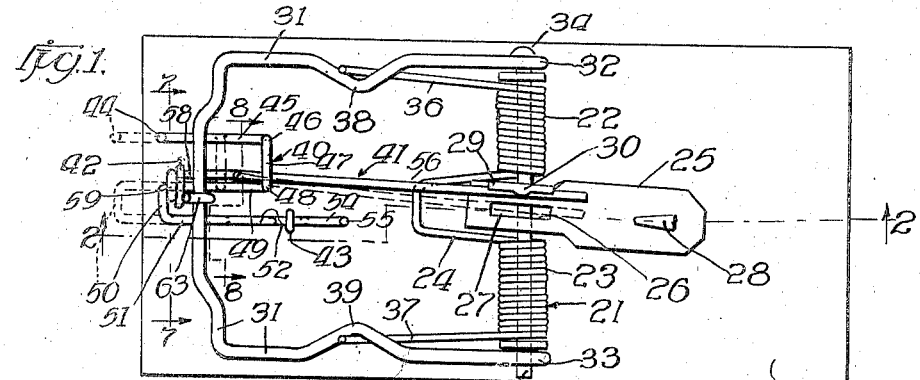
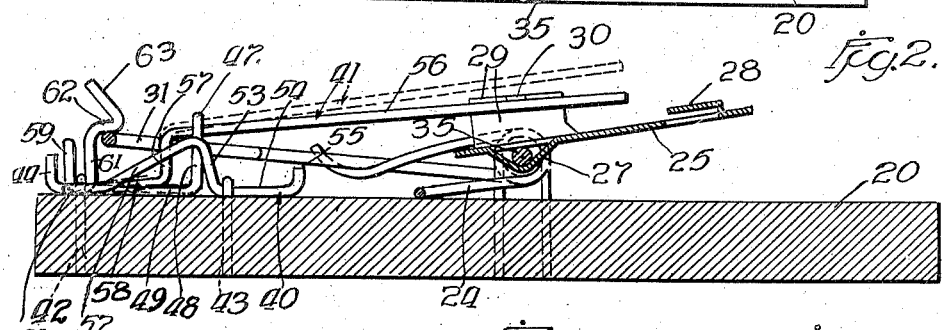
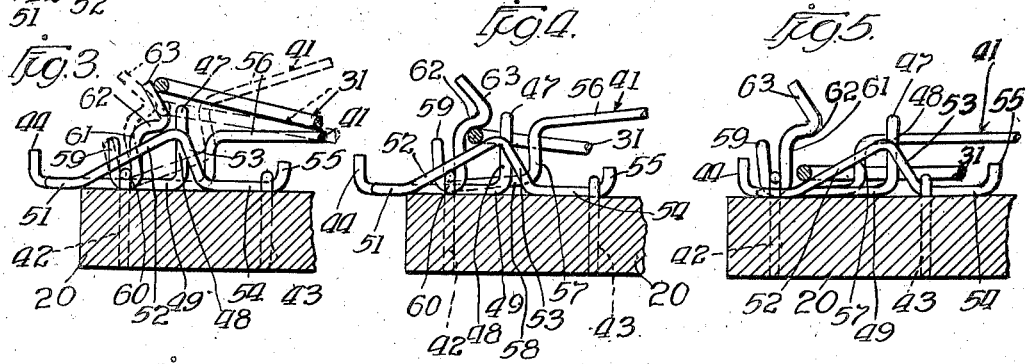
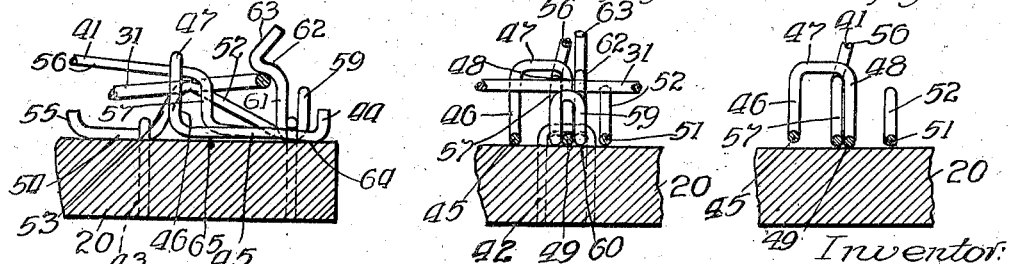
Inventor:
Herbert A. Stilson
By Harvey L. Hanson
Attorney
Witness:
Harry R. L. White Feb. 7, 1939.    H. A. STILSON    2,146,361
ANIMAL TRAP
Filed Feb. 15, 1937    2 Sheets-Sheet 2
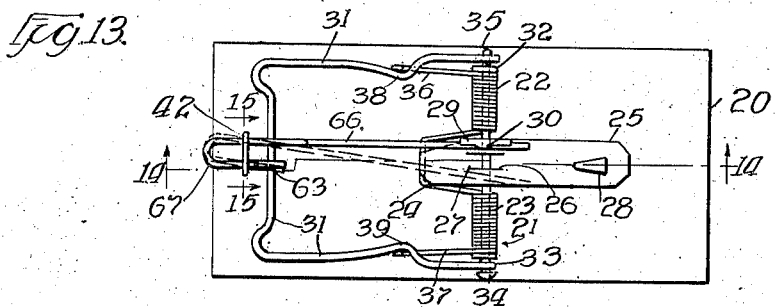
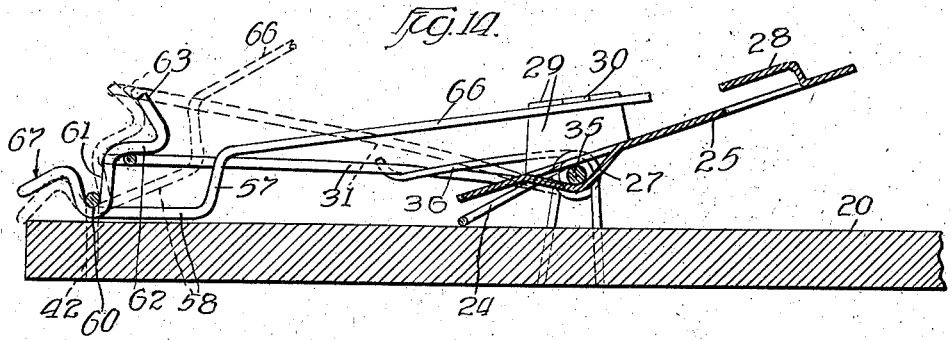
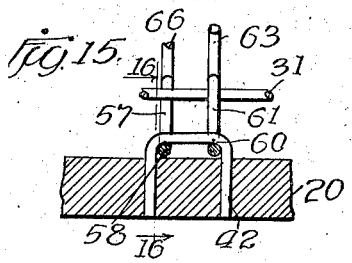
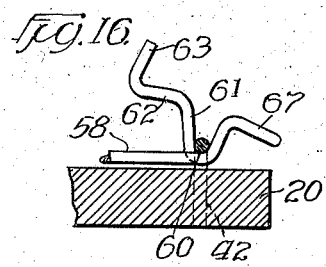
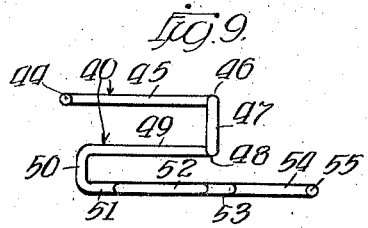
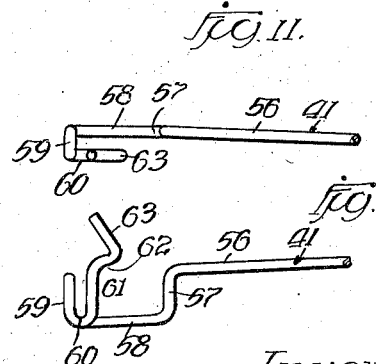
Inventor
Herbert A. Stilson
By Harvey L. Hanson
Attorney
Witness:
Harry R. L. White Patented Feb. 7, 1939

2,146,361

UNITED STATES PATENT OFFICE 2,146,361

ANIMAL TRAP

Herbert A. Stilson, Chicago, Ill., assignor to McGill Metal Products Company, Chicago, Ill., a corporation of Illinois Application February 15, 1937, Serial No. 125,766

17 Claims. (Cl. 43—81)

The invention relates to animal traps and particularly to safety mechanism for animal traps embodying a latch and a reciprocating or sliding latch holder.

The present invention is for a structure which is especially adapted to be used with certain features of the trap disclosed in United States Letters Patent No. 1,530,918, issued March 24, 1925 to Will C. Stilson and me. This patent shows an animal trap and especially one for trapping rats and mice in which there is provided trigger mechanism which may be used with the latch of the present case although it will be understood that other forms of trigger mechanism may be used.

The principal object of the invention is to construct the latch and the latch holder with certain safety features whereby in setting the trap on depression of the fall or jaw thereof the latch is automatically raised and lowered within certain limits, and upon further depression of the jaw the latch holder is slidably moved forwardly to hold down the latch and keep the jaw from springing until the latch holder, without danger to the operator, may be moved rearwardly to place the trap in set position ready to be sprung.

Another object of the invention is to provide the latch with an inclined plane and to provide the latch holder with an inclined plane, the two inclined planes extending in divergent directions.

An additional object of the invention is to construct the oppositely extending inclined planes of the latch and the latch holder, respectively, integrally with said latch and latch holder, the inclined planes being of different lengths and one placed in a higher position than the other with relation to the base of the trap.

It is a further object of the invention to provide the latch holder with an inverted U shaped portion, or arch, entirely outside the path of travel of the jaw of the trap, which will prevent the latch and jaw from being released from the set position until the latch holder with its arch is moved.

It is one of the objects of the invention to operate the latch holder with respect to the latch so that it may be moved rearwardly of the trap out of latch holding position with no parts of the latch holder or the latch obstructing the passage of the jaw in its path when being sprung.

An additional object of the invention is to operate the jaw on the latch holder, having the jaw make contact with the inclined plane thereof, and upon being pressed downwardly to cause the latch holder to slide forwardly so that the arch of the latch holder will be above the latch and cause the latch to maintain its position with relation to the trigger.

This will cause the jaw to be held in restrained position and against operation until the latch holder is moved rearwardly causing the arch of the latch holder to be free of the latch although the arch in its travel rearwardly does not contact with any portion of the jaw or get into the path of travel of the jaw.

A modified form of the invention is shown and described herein, employing trigger and latch mechanism but not including latch holding mechanism such as is included in the other trap referred to herein.

The invention will be further understood by reference to the accompanying drawings showing the two embodiments of the invention in connection with a rat trap and a mouse trap but it will be understood that I do not limit myself to the exact construction shown and illustrated, but in the claims hereinafter set forth, I intend to cover all variations and modifications of the invention.

In the drawings:

Figure 1 is a top plan view on a reduced scale showing the fall or jaw of the animal trap in held position in full lines and with the latch and latch holder in released position in dotted lines.

Figure 2 is an enlarged side elevational view, partly in section, of the animal trap of Figure 1 with the parts in held position with the end bar of the jaw below the top inclined plane on the line 2—2 of Figure 1.

Figure 3 is an enlarged side elevational view of the latch and latch holder in released position in full lines showing the jaw bar resting at the upper end of the top inclined plane and also showing in dotted lines the movement of the jaw bar downwardly on the top inclined plane.

Figure 4 is an enlarged side elevational view of the latch and latch holder showing the jaw bar after it has completed its travel downwardly on the top inclined plane and is about to descend on the lower inclined plane.

Figure 5 is an enlarged side elevational view of the latch and latch holder and shows the jaw bar after it has traveled downwardly on the lower inclined plane and reached the bottom, and has forced the latch holder forwardly.

Figure 6 is an enlarged view of the latch and the latch holder and is a side elevational view thereof on the opposite side of the trap from that shown in Figures 2, 3, 4, and 5, and illustrates the position of the latch, the latch holder, and the jaw when the parts are in the position shown in Figure 2.

Figure 7 is an enlarged rear view of the latch, latch holder, and bar of the jaw on the line 7—7 of Figure 1.

Figure 8 is an enlarged view of the latch and latch holder on the line 8—8 of Figure 1.

Figure 9 is a top plan view of the latch holder.

Figure 10 is a side elevational view of the latch holder.

Figure 11 is a top plan view of the rear end portion of the latch.

Figure 12 is a side elevational view of the rear end portion of the latch.

Figure 13 is a full size top plan view of the smaller trap or mouse trap which employs the latch of the invention but not the latch holder.

Figure 14 is an enlarged side elevational view, partly in section, of the trap shown in Figure 13 on the line 14—14 and shows in full lines the latch in held position with the bar of the jaw below the inclined plane of the latch and in dotted lines the bar of the jaw at the upper portion of the inclined plane of the latch.

Figure 15 is a rear view, partly in elevation and partly in section, on the line 15—15 of Figure 13.

Figure 16 is a view on the side opposite that shown in Figure 14 on the line 16—16 of Figure 15 and illustrates in elevation, the rear portion of the latch.

Like reference characters in the various figures of the drawings indicate similar parts of the structure.

The trap of the invention as illustrated in Figures 1 to 12 inclusive, and which is preferably used as a rat trap, comprises the base 20 which is preferably of wood but may be of metal or other suitable material. A relatively strong coil spring 21 formed with two coiled sections 22 and 23, respectively, is supported on a pintle which extends transversely of the base and has its ends in the spring posts or supports near the side edges of the base. The coil spring 21 is provided with the integral central base support 24.

A bait holder or trigger 25 is loosely mounted on the transverse pintle between the coiled sections 22 and 23 of the spring 21. The bait holder or trigger is provided with the elongated aperture 26 with the depressed trigger portion 27 extending under the transverse pintle thus holding the trigger in place and loosely swinging between the two coiled spring sections 22 and 23.

The trigger is also provided with the bait hook 28 at one end thereof. It will be seen that the bait hook is at the longer or relatively heavier end of the trigger 25 and the shorter end thereof is adjacent the pintle. The trigger 25 is also provided with the upturned side section 29 which is turned inwardly at its top end to form the relatively smaller extending lip or stop 30.

The restraining fall or jaw 31 formed with side portions and an end or bar portion is provided with the loops 32 and 33. The pintle extends through these loops 32 and 33 which are outside of the spring posts or supports but are held against removal by the head 34 and the flattened portion 35 on the respective ends of the pintle.

The jaw 31 is always held under the tension of the spring 21 by the spring ends 36 and 37, the ends of which extend over the jaw 31 at the inturned portions 38 and 39 respectively. These spring ends 36 and 37 contact with the jaw 31 and hold the same down against the base at the forward end of the base when the trap is in inoperative position.

When it is desired to set the trap and place the restraining jaw 31 in operative position with the parts which have been described up to this point, the restraining jaw is brought from its unset or inoperative position to the opposite or rear side of the base to be held by the latch holder generally designated 40, and the latch generally designated 41 in association with the trigger 25.

A staple 42 is provided which has its legs embedded in the base 20 and its top cross portion relatively close to the top surface of the base in order to limit to some extent the upward and lateral movement of the latch. The staple 42 holds both the latch holder and the latch in operative position. A staple 43 also having its legs embedded in the base is provided and holds the forward end of the latch holder so it may reciprocate or slide on the base.

The latch holder generally designated 40 is preferably made of wire of suitable gauge but may be made of other suitable material. For convenience in referring hereinafter to the latch holder each portion of the latch holder will be given a separate numeral.

The upstanding handle 44 which is used to reciprocate the latch holder 40 under the two staples 42 and 43 is at the rear end of the portion 45. The inverted U shaped portion or arch having the sections 46, 47, and 48 is at the forward end of the portion 45. The arch joins with the central portion 49 which extends rearwardly to the cross portion 50 and reciprocates under the staple 42. The cross portion 50 joins with the portion 51 which extends forwardly to the relatively long lower inclined plane portion 52 which extends upwardly to the leg portion 53 which extends downwardly and connects with the forward portion 54 which reciprocates in the loop formed by the staple 43 and which terminates in the limiting stop 55.

The latch generally designated 41 is provided with the main extended latch portion 56, the forward end portion of which is the part which is brought over the bait trigger 25 against the inner face of the upturned portion 29 and under the lip 30. The rear portion of the latch 41 is formed with the downwardly extending portion 57 which extends to the portion 58, the rear portion of which is under the staple 42.

At the rear end of the portion 58, an inverted U shaped portion 59 is formed which is connected with the portion 60 which also lies beneath the arch portion of the staple 42. An upwardly extending portion 61 extends to a forwardly extending portion 62 at the forward end of which the relatively short top inclined plane portion 63 extends upwardly and rearwardly. The portion 49 of the latch holder which reciprocates beneath the staple 42 also reciprocates beneath the portion 59 and between the portions 58 and 60 of the latch 41.

It will be understood that the relation of the staple 42 and the various portions of the latch and latch holder is such that the latch is limited in its upper and lateral movements to some extent but there must be sufficient movement upward and laterally to efficiently operate the trap.

In the operation of the trap illustrated in Figures 1 to 12 inclusive, the restraining fall or jaw 31 is brought to the rear of the trap against the action of the spring 21 with its spring ends 36 and 37 acting as tension members. As the cross bar of the jaw 31 is brought down it engages the top inclined plane latch portion 63 as illustrated in the full lines in Figure 3.

The jaw bar is then pressed downwardly in engagement with the forward or upper face of the portion 63 as shown in the dotted lines of Figure 3. This action of pressing down on the rear portion of the latch 41 causes the forward portion of the latch 41 to pivot under the staple 42 and raise the forward end of the latch 41 a limited distance as shown in Figure 3.

Downward pressure on the jaw 31 is continued so that the jaw bar travels beyond the portion 63 and below the portion 62 of the latch as illustrated in Figures 2, 4, and 6 of the drawings. After the jaw bar passes the lower end of the portion 63, gravity causes the latch 41 to pivot and fall from its uppermost position downwardly as shown in Figures 2, 4, and 6. In falling, the latch will generally fall on the trigger 25 and to the right side of and adjacent the trigger portion 29 where the latch may readily be placed under the overhanging lip 30. The free end portion of the latch is never in the path of travel of the jaw 31.

During the foregoing described operation of the jaw bar raising and gravity lowering the latch 41, the latch holder 40 is in released or inoperative position at its rearmost position beneath the jaw bar as shown in the dotted lines of Figure 1. At this time the cross bar of the jaw 31 is above the long lower inclined plane portion 52 at its forward end and as the jaw bar is pressed further downwardly it contacts with the inclined plane portion 52 and forces the entire latch holder 40 forwardly as shown in the full lines of Figure 1 and in Figure 5.

When the jaw bar moves the latch holder forwardly because of its passage downwardly on the inclined plane surface 52, the portions 45, 49, 51, and 54 slide forwardly frictionally engaging the upper face of the base 20 of the trap. The portion 49 slides beneath both the staple 42 and the inverted U shaped portion 59 of the latch, and the portion 54 slides forwardly beneath the staple 43.

A very important feature of the invention is disclosed in this operation of the latch holder 40 in that the inverted U shaped holder portion or arch formed by the portions 46, 47, and 48 passes over the rear end of the portion 56 of the latch and holds it down. It is this arch or U shaped safety catch 47 which holds the latch 41 down.

The forward end of the latch 41 may then be brought over the trigger alongside the portion 29 and under the lip 30. The trigger 25 may be baited on the bait holder 28 either before or after the forward end of the latch portion 56 is set in position. At this time there is no danger of the jaw 31 springing and endangering the operator because the arch 47 of the latch holder 40 holds the latch 41 down and also under the lip 30 and since the latch is an integral member, prevents the jaw from springing.

When the latch holder is moved to its rearmost position, the arch 47 is entirely away from the portion 56 of the latch but at this time it is the trigger 25 with the overhanging lip 30 and the latch 41 which holds the jaw 31 in set or operative position. When the trap is sprung at this particular stage, the portion 62 with the top inclined portion 63 does not serve as a safety or protective device or hook as is readily seen in the drawings and demonstrated in practice.

As soon as the trigger 25 is operated by the animal the jaw snaps and the trap is sprung because of the absence of the protective catch or arch 47 over the latch portion 56. It will be noted that when the latch holder 40 has been moved to its furthest position rearwardly, the safety catch or holder arch is entirely outside of the path of travel of the jaw. The trap is constructed in such a way that the safety catch or arch is never in the path of travel of the jaw or the jaw bar 31.

The preferred practice in moving the latch holder either backwardly or forwardly is to grasp the holder by the handle 44 and move it backwardly or forwardly. It has been found to be good practice in connection with the operation of the latch holder 40, to keep it as close to the top surface of the base 20 as possible.

Inasmuch as the wood bases which are employed are usually of relatively soft wood, it has been found good practice to bend the holder portion 49 slightly downward as indicated at 64, in order to provide friction means to hold the latch holder in set or safety position. When the latch holder is then forced to its furthest position forward, as is shown particularly in Figure 6, a small air space 65 is left btween the holder portion 45 and the base 20.

In the embodiment of the invention shown in Figures 13 to 16 inclusive, illustrating a smaller trap than that shown in Figures 1 to 12 inclusive, and preferably used as a mouse trap, the construction is substantially similar to that shown in the trap illustrated in Figures 1 to 12 except that no latch holder similar to the latch holder 40 is employed. The latch generally designated 66 is substantially identical in construction with the latch 41 but has a differently shaped bent portion 67 as is best shown in Figures 14 and 16 of the drawings.

In operating the trap shown in Figures 13 to 16, the jaw 31 is brought to position at the top of the inclined portion 63 and as the jaw is pressed downwardly it assumes the position heretofore described and illustrated in Figures 2, 3, 4, and 14. When the jaw is pressed to its lowest position, the jaw bar is beneath the portion 62 and the inclined portion 63 as shown in full lines in Figure 14. The forward end of the portion 56 of the latch is then brought into position on the trigger 25 beside the upwardly extending portion 29 and under the extended lip 30.

At this time the latch portion 56 being caught under the lip 30 and having the jaw bar underneath the portion 62 of the latch, the trap is ready to be sprung when the trigger, which has been duly baited, is disturbed or moved. When the trigger 25 is moved the forward end of the portion 56 is moved out of position from under the lip 30 and the jaw snaps out of position from under the portion 62 without hindrance. The portion 62 is not designed to hold the jaw and does not hold it from operating.

What I claim and desire to secure by Letters Patent is:

1. In an animal trap the combination of a spring, a jaw operated by said spring, a trigger, a latch, said latch and trigger cooperating to hold said jaw in operative position, an arch secured in the base of said trap at its rear portion, the top of said arch being relatively close to the top surface of said base, said latch being provided with an integral upwardly extending inclined portion upon which said jaw may be depressed to raise said latch prior to said latch being held, and a sliding member which member slides under said arch and holds said latch and prevents said latch from releasing said jaw.

2. In an animal trap the combination of a spring, a jaw operated by said spring, a trigger, a latch, said latch and trigger cooperating to hold said jaw in operative position, and a staple secured in said base at its rear portion, the top of said staple being relatively close to the top surface of said base, said latch being provided with an integral upwardly and rearwardly extending inclined portion upon which said jaw may be depressed to automatically raise said latch prior to said latch being held, said latch being formed with a series of bent sections, one of the bent sections on the side of the latch forward of the staple including a rearwardly extending section, a forwardly extending section and an upwardly and rearwardly extending inclined section, said inclined section being situated to receive the downward pressure of the jaw and cause said latch to raise automatically.

3. In an animal trap the combination of a spring, a jaw operated by said spring, a trigger, a latch, said latch and trigger cooperating to hold said jaw in operative position, and a staple secured in said base at its rear portion, the top of said staple being relatively close to the top surface of said base, said latch being provided with an integral upwardly and rearwardly extending inclined portion upon which said jaw may be depressed to automatically raise said latch prior to said latch being held, said latch being formed with a series of bent sections extending upwardly from said base on each side of said staple, one of the bent sections on the side of the latch forward of the staple including a rearwardly extending section, a forwardly extending section and an upwardly and rearwardly extending inclined section, said inclined section being situated to receive the downward pressure of the jaw and cause said latch to automatically raise, said series of bends being arranged in two alignments at the rear portion of said latch, one alignment at one side of said staple and the other alignment at the other side of said staple.

4. In an animal trap the combination of a spring, a jaw operated by said spring, a trigger, a latch, said latch and trigger cooperating to hold said jaw in operative position, and a staple secured in said base relatively close to the rear edge of said base, the top of said staple being relatively close to the top surface of said base, said latch being formed with a series of bent portions on each side of said staple, said bent portions including a rearwardly, a forwardly extending portion, and an upwardly and rearwardly extending inclined portion, said inclined portion being situated to receive the downward pressure of the jaw and cause said latch to automatically raise, said staple having its top cross portion loosely contacting said latch adjacent the uprights of said staple and forming a pivotal connection for said latch.

5. In an animal trap the combination of a base, a restraining jaw, a spring, a trigger, a latch, said trigger and latch acting cooperatively with said spring to move said jaw and a sliding member to hold said latch to cause said latch to restrain said jaw from operating.

6. In an animal trap the combination of a base, a restraining jaw, a spring, a trigger, a latch, said trigger and latch acting cooperatively with said spring to move said jaw and a sliding member to hold said latch to cause said latch to restrain said jaw from operating, said sliding member being provided with an arch portion, said arch portion overlying said latch when said jaw is in operative position.

7. In an animal trap the combination of a base, a restraining jaw, a spring, a trigger, a latch, said trigger and latch acting cooperatively with said spring to move said jaw, and a sliding member to hold said latch to cause said latch to restrain said jaw from operating, said sliding member being provided with an arch, said arch overlying said latch when said jaw is in operative position and said arch being out of the line of travel of said jaw.

8. In an animal trap the combination of a base, a restraining jaw, a spring, a trigger, a latch, said trigger and latch acting cooperatively with said spring to move said jaw, a sliding member to hold said latch to cause said latch to restrain said jaw from operating, said sliding member being provided with an arch, said arch overlying said latch when said jaw is in operative position, said latch having its major length and free end raised and its rearward portion bent in a number of places to form a lowered portion and an upright portion, and a staple, said staple being relatively close to the top surface of said base and holding said latch under said staple and forming a pivot thereby, the arch of said latch holder being movable rearwardly from over the raised portion of the latch to a position over the lowered portion of said latch but out of the line of travel of said jaw.

9. In an animal trap the combination of a base, a restraining jaw, a spring, a trigger, a latch, said trigger and latch acting cooperatively with said spring to move said jaw, and a sliding member to hold said latch to cause said latch to restrain said jaw from operating, said sliding latch holder being provided with a safety arch and inclined portion whereby said latch holder may slide forwardly upon pressure exerted downwardly on said inclined portion by said jaw, whereupon the arch of said latch holder moves over said latch and holds the said latch down whereby said jaw is restrained from accidental release.

10. In an animal trap the combination of a base, a restraining jaw, a spring which operates the jaw, a trigger, a latch, a sliding latch holder, and a pair of staples, the first of said staples being relatively close to the top face of said base and holding said latch and latch holder, and the second of said staples acting as a guideway for the sliding of said latch holder, said latch holder with said trigger and said latch cooperating to hold said jaw in set position.

11. In an animal trap the combination of a base, a restraining jaw, a spring which operates the jaw, a trigger, a latch, a sliding latch holder, and a pair of staples, the first of said staples being relatively close to the top face of said base adjacent the rear edge of the base and holding said latch and holder, the second of said staples acting as a guideway for the sliding of said latch holder, said latch holder being provided with a handle at one end, a limiting stop at the other end, and intermediate of the two ends an arch which extends over the free and forward end of the latch, an inclined plane portion, said latch holder being slidable in a forward direction when said jaw is forced downwardly on said inclined plane portion causing the arch of said latch holder to overlie the latch and hold the jaw in set position.

12. In an animal trap the combination of a base, a restraining jaw, a spring which operates the jaw, a trigger, a latch, a sliding latch holder, and a pair of staples, the first of said staples being relatively close to the top face of said base adjacent the rear edge of the base and holding said latch and holder, the second of said staples acting as a guideway for the sliding of said latch holder, said latch holder being provided with a handle at one end, a limiting stop at the other end, and intermediate of the two ends an arch which extends over the free and forward end of the latch, an inclined plane portion, said latch holder being slidable in a forward direction when said jaw is forced downwardly on said inclined plane portion causing the arch of said latch holder to overlie the latch and hold the jaw in set position, one of the portions of said latch holder adjacent the top surface of said base reciprocating between two portions of said latch, the three portions last mentioned being movable beneath the staple adjacent the rear of said base.

13. In an animal trap the combination of a base, a restraining jaw, a spring which operates the jaw, a trigger, a latch, a sliding latch holder, and a pair of staples, the first of said staples being relatively close to the top face of said base adjacent the rear edge of the base and holding said latch and holder, the second of said staples acting as a guideway for the sliding of said latch holder, said latch holder being provided with a handle at one end, a limiting stop at the other end, and intermediate of the two ends an arch which extends over the free and forward end of the latch, an inclined plane portion, said latch holder being slidable in a forward direction when said jaw is forced downwardly on said inclined plane portion causing the arch of said latch holder to overlie the latch and hold the jaw in set position, one of the portions of said latch holder adjacent the top surface of said base reciprocating between two portions of said latch, the three portions last mentioned being movable beneath the staple adjacent the rear of said base, said latch holder portion being slidable and said two latch portions being pivotally arranged with respect to said last mentioned staple.

14. In an animal trap the combination of a base, a restraining jaw, a spring which operates the jaw, a trigger, a latch, a sliding latch holder, and a pair of staples, the first of said staples being relatively close to the top face of said base adjacent the rear edge of the base and holding said latch and holder, the second of said staples acting as a guideway for the sliding of said latch holder, said latch holder being provided with a handle at one end, a limiting stop at the other end, and intermediate of the two ends an arch which extends over the free and forward end of the latch, an inclined plane portion, said latch holder being slidable in a forward direction when said jaw is forced downwardly on said inclined plane portion causing the arch of said latch holder to overlie the latch and hold the jaw in set position, one of the portions of said latch holder adjacent the top surface of said base reciprocating between two portions of said latch, the three portions last mentioned being movable beneath the staple adjacent the rear of said base, said latch holder portion being slidable and said two latch portions being pivotally arranged with respect to said last mentioned staple, said latch being provided with a rearwardly extending portion which with the aid of said staple limits the upward and lateral movements of said latch.

15. In an animal trap the combination of a restraining jaw, a spring to operate said jaw, a trigger, a latch, said trigger and latch cooperating to hold said jaw in operative position, and a safety latch holder, said safety latch holder being provided with an arch portion, said arch portion extending over said latch, said safety latch holder being also provided with an inclined plane on which said jaw moves downwardly to move said safety latch holder forwardly, said latch also being provided with an inclined plane upon which said jaw moves downwardly to automatically raise said latch, said inclined planes extending in opposite directions.

16. In an animal trap the combination of a restraining jaw, a spring to operate said jaw, a trigger, a latch, said trigger and latch cooperating to hold said jaw in operative position, and a safety latch holder, said safety latch holder being provided with an arch portion, said arch portion extending over said latch, said safety latch holder being also provided with an inclined plane on which said jaw moves downwardly to move said safety latch holder forwardly, said latch also being provided with an inclined plane upon which said jaw moves downwardly to automatically raise said latch, said inclined planes extending in opposite directions, and being in different longitudinal planes.

17. In an animal trap the combination of a restraining jaw, a spring to operate said jaw, a trigger, a latch, said trigger and latch cooperating to hold said jaw in operative position, and a safety latch holder, said safety latch holder being provided with an arch portion, said arch portion extending over said latch, said safety latch holder being also provided with an inclined plane on which said jaw moves downwardly to move said safety latch holder forwardly, said latch also being provided with an inclined plane upon which said jaw moves downwardly to automatically raise said latch, said inclined planes extending in opposite directions, being of different lengths, and being in different longitudinal planes, and said inclined planes also being in different longitudinal planes than said latch holder arch.

HERBERT A. STILSON.